United States Patent [19]
Minamizawa et al.

[11] Patent Number: 5,548,412
[45] Date of Patent: *Aug. 20, 1996

[54] DATA COMMUNICATION DEVICE WITH TRANSMITTING CONDITION SET IN ACCORDANCE WITH NOISE LEVEL OF ACTIVATING MEANS

[75] Inventors: Fumihiro Minamizawa; Masayoshi Iguchi; Koji Takeyama, all of Aichi-ken, Japan

[73] Assignee: Brother Kogyo Kabushiki Kaisha, Aichi-ken, Japan

[*] Notice: The term of this patent shall not extend beyond the expiration date of Pat. No. 5,406,385.

[21] Appl. No.: 347,963

[22] Filed: Dec. 1, 1994

Related U.S. Application Data

[63] Continuation-in-part of Ser. No. 118,418, Sep. 8, 1993, Pat. No. 5,406,385.

[30] Foreign Application Priority Data

Sep. 14, 1992 [JP] Japan ................................. 4-271194
Dec. 1, 1993 [JP] Japan ................................. 5-301435
Oct. 7, 1994 [JP] Japan ................................. 6-244144

[51] Int. Cl.$^6$ ............................. H04N 1/32; H04N 1/327
[52] U.S. Cl. ......................... 358/406; 358/435; 358/436
[58] Field of Search ............................ 358/406, 405, 358/434, 435, 436, 438, 439, 463, 468

[56] References Cited

U.S. PATENT DOCUMENTS 4,630,126 12/1986 Kaku et al. .......................... 358/406
5,406,385 4/1995 Iguchi et al. ......................... 358/406

*Primary Examiner*—Scott A. Rogers
*Attorney, Agent, or Firm*—Kane, Dalsimer, Sullivan, Kurucz, Levy, Eisele and Richard, LLP

[57] ABSTRACT

A data communicating device is provided having an actuating means that is driven when data is to be transmitted/received. Prior to transmitting/receiving data, the actuating means is driven and a transmission condition is set in accordance with a determined noise level of the actuating means. The data is then transmitted/received in accordance with the thus set transmission condition.

16 Claims, 4 Drawing Sheets

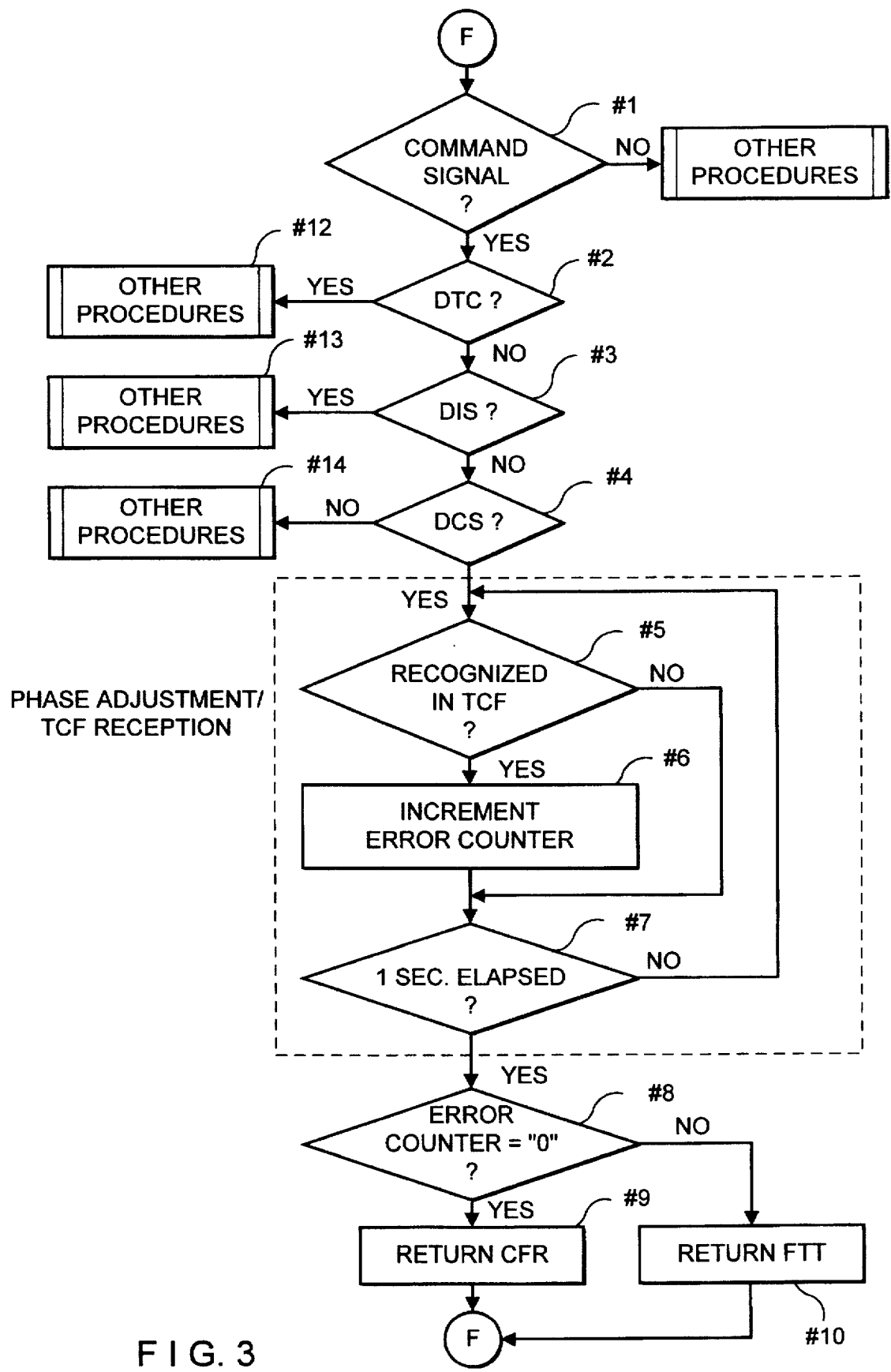
F I G. 3

5,548,412

1

DATA COMMUNICATION DEVICE WITH TRANSMITTING CONDITION SET IN ACCORDANCE WITH NOISE LEVEL OF ACTIVATING MEANS

NOTATION ON APPLICATION

This application is a continuation-in-part application of the application entitled "FACSIMILE DEVICE", filed on Sep. 8, 1993, in the name of Masavoshi IGUCHI and Koji TAKEYAMA, Ser. No. 08/118,418, now U.S. Pat. No. 5,406,385.

BACKGROUND OF THE INVENTION

The present invention relates to a data communication device, and more specifically to an error processing technique used in a data communication device such as a facsimile device.

Conventionally in a data communication device such as a facsimile device, various device noise is generated internally during operation of the device itself. For example, actuation noise of an electric motor is produced when the motor is feeding a sheet to be scanned or printed.

Before transmitting image data, a TCF signal (transmission confirmation signal) is transmitted between a calling facsimile device (hereinafter referred to as a calling station) and a called facsimile device (hereinafter referred to as a called station). During TCF transmission, a transmission baud rate is established between the calling and called stations. This transmission baud rate is determined based on the electrical noise present in the communication channel between the two stations.

However, in the conventional facsimile devices, the electrical noise present in the communication channel during TCF transmission is different than the electrical noise present during image transmission, since the motors used to feed the scanned sheet and printed sheet are not actuated during TCF transmission. Therefore, a baud rate established during TCF transmission may be inadequate for proper transmission of the image data, resulting in many data errors during transmission of the image data.

One solution proposed to overcome this defect is to actuate the driving motors of the called station during transmission of the TCF signal in order to more accurately determine a baud rate during the transmission of image data.

However, for facsimile devices that employ a memory for storing a document, i.e., data to be transmitted or received data, it is unnecessary to have the motors driven during image data transmission/reception. If the motor is actuated during the transmission/reception of the TCF signal, more electrical noise is present on the communication line than will be present during the transmission of image data. Thus, a baud rate that is determined for use during image data transmission/reception will be lower than is necessary for proper data transfer. This results in a longer transmission time being required to transfer the image data than is necessary.

SUMMARY OF THE INVENTION

It is therefore an object of the present invention to provide a facsimile device which can determine optimum transmission parameters such as baud rate depending on whether an actuation element such as a motor is to be driven during transmission/reception of image data. Further, the facsimile device will actuate the actuation element during the transmission of a TCF signal if it is determined that the actuation element is to be driven during image data transmission/reception.

For the above object, according to the invention, there is provided a data communicating device for at least transmitting or receiving data, comprising: an actuating means, electrical noise being generated when the actuating means is driven; means for determining whether the actuating means is to be driven to perform a predetermined operation when the data is transmitted/received; means for setting a transmission condition prior to transmission/reception of the data, the transmission condition being set by performing a predetermined communication procedure; and means for controlling the actuating means to be operated while the predetermined communication procedure is performed if the determining means determines that the actuating means is driven when the data is transmitted/received, wherein the data is transmitted/received in accordance with the transmission condition set by the setting means.

Optionally, the data communicating device further comprising a memory for storing received data and/or data to be transmitted, wherein the actuating means comprises data recording means for recording the stored data, and wherein the determining means determines whether the data recording means is actuated when the data is transmitted/received. Alternatively, the actuating means comprises data obtaining means for obtaining data to be transmitted, and wherein the determining means determines whether the data obtaining means is actuated when the data is transmitted/received. Thus, if transmitting/reception of the data will be performed simultaneously with the recording/obtaining operation, the predetermined communication procedure is also performed with executing the data recording/obtaining operation.

Preferably, the data transmitted/received by the data communicating device is an image data.

Preferably, the transmission condition includes a transmission rate at which the data is communicated through a communication line connected to the communication device, and wherein the setting means sets the transmission rate depending on a level of noise present in the communication line when the predetermined communication procedure is being performed.

Optionally the actuating means comprises a step motor, a phase of the step motor energized during the predetermined communicating procedure being unchanged. Thus, when the transmission condition is determined, the actuating means is actuated but the actuating means does not perform the predetermined operation.

According to another aspect of the invention, there is provided a method of transmitting/receiving data through a communication line employed in a data communicating device, the device having an actuating means which generates electrical noise, comprising steps of: determining whether the actuating means is to be driven when the data is transmitted/received; actuating the actuating means if the actuating means is to be driven when the data is transmitted/ received; setting a transmission condition; and transmitting/ receiving the data in accordance with the set transmission condition.

Optionally, the transmission condition comprises a transmission rate at which the data is transmitted/received.

BRIEF DESCRIPTION OF THE DRAWINGS

FIG. 3 is a flowchart of a signaling procedure of the facsimile device; and

DESCRIPTION OF THE EMBODIMENTS

An embodiment of the present invention will be described below with reference to the accompanying drawings.

Figure 1:
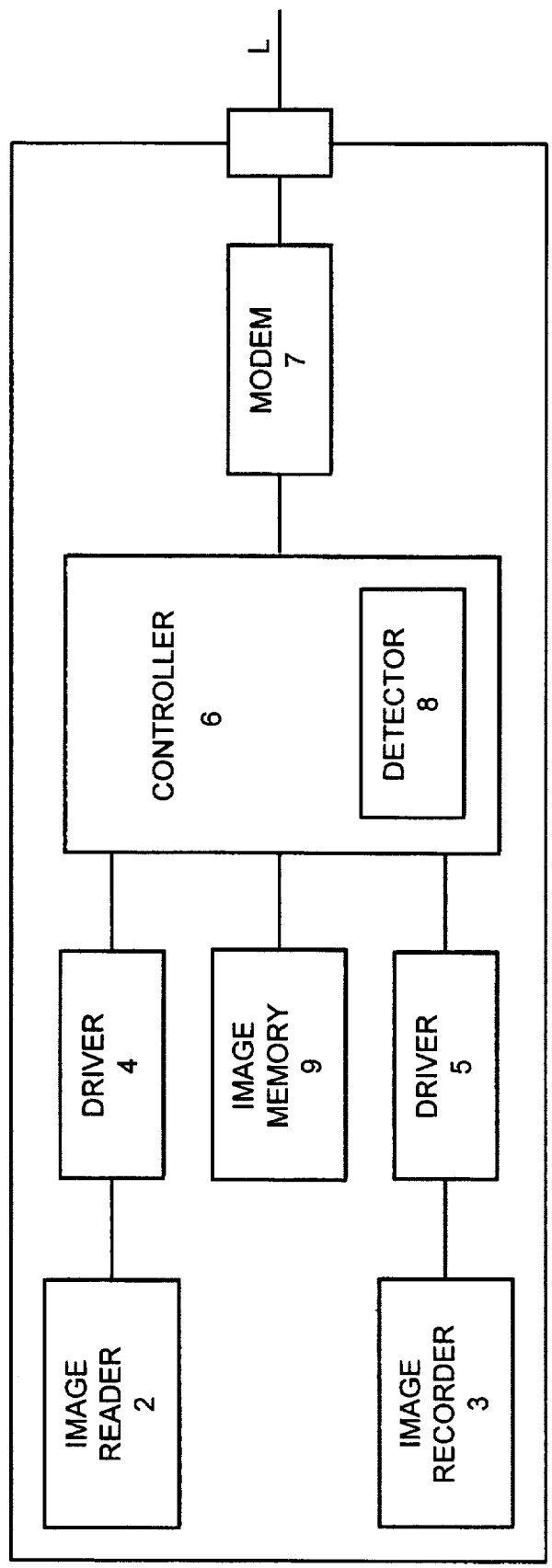
FIG. 1 is a block diagram of a facsimile device according to the present invention.

FIG. 1 shows a schematic configuration of the facsimile device. The facsimile device 1 has an image reader 2 for reading an original to be transmitted, and an image data recorder 3 for recording received image data. Further, the device 1 has a pair of drivers 4, 5 including respective actuation elements such as motors for driving the image reader 2 and the image data recorder 3, controller 6 for controlling the operation of the facsimile device including drivers 4, 5 and other elements, and a modem 7 for modulating/demodulating image data to be transmitted or received data. The controller 6 includes a detector 8 for detecting the level of noise contained in received signals. The device 1 is connected to another similar facsimile device through a line L for transmitting image data to and receiving image data from the other facsimile device. The facsimile device 1 is operable in a memory mode, or in a dual operation mode. In a memory mode, the image data to be transmitted or the received image data is stored in the memory 9. Then the stored data is transmitted or printed. If more data is received while the stored data is being printed, then the operation mode is changed to the dual operation mode, and printing and receiving/storing operations are performed simultaneously. Similarly, while the stored data is transmitted, in the dual mode, another document can be read and stored in the memory 9. Furthermore, if the memory 9 becomes full when a document is read or data is received, then operation mode is switched to the dual mode, and the reading or data receiving operations are executed simultaneously with the transmitting or printing of the stored data.

Figure 2:
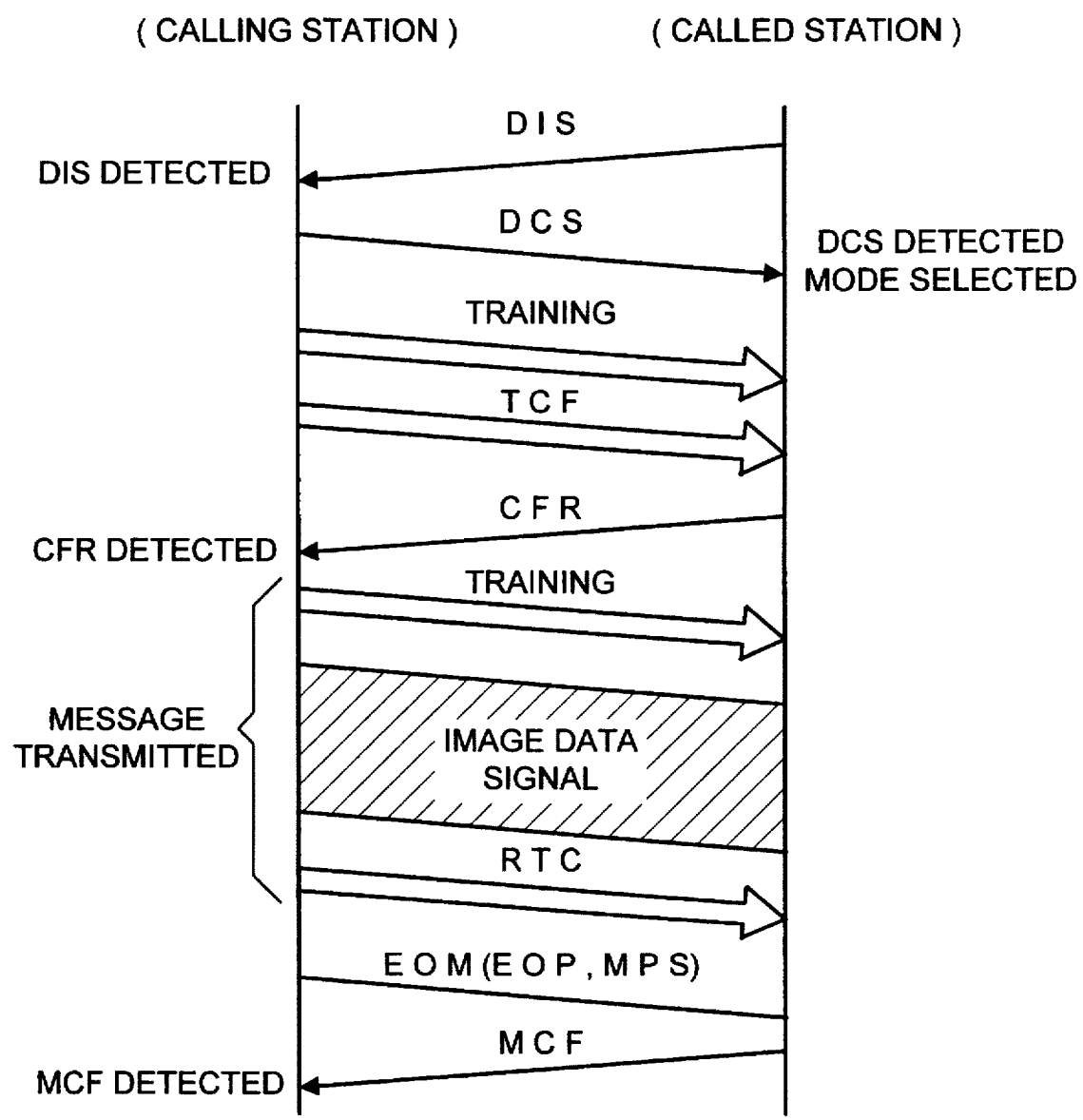
FIG. 2 is a diagram of a transmission control sequence protocol signals including handshake and image signals exchanged between two connected facsimile devices.

Operation of the facsimile device 1 will be described below with reference to FIG. 2 illustrating protocol signals of facsimile devices.

In this example, the facsimile device 1 is located at the called station.

When a connection is established between a calling station and the called station through the line, the called station sends a DIS (Digital Identification Signal) indicative of its own function to the calling station. In response to the reception of the DIS signal, the calling station transmits a DCS (Digital Command Signal) which sets the function and indicates a transmission mode to the called station. The calling station subsequently transmits a modem training signal and a TCF signal to the called station. In response to the reception of the modem training signal, the called station sets up an automatic equalizer which compensates for an error signal that is produced from a series of received and demodulated signals due to a distortion occurred in the line L. The called station also checks the condition of the line L based on the TCF signal.

If the motor of the driver 5 is to be driven when the image data is received, the called station energizes the motor of the driver 5 for a predetermined period of time while the called station is receiving the TCF signal so that the received TCF signal contains the electric device noise produced by the energized motor of the driver 5. If the motor of the driver 5 is not to be driven when the image data is received, then the TCF signal is received without the energization of the motor of the driver 5. This would occur if the image data is to be stored in an image memory 9 instead of being printed on a recording sheet during reception of the image data.

The controller 6 of the called station detects the electric device noise contained in the received signal. If the level of the device noise is low and the condition of the line L is normal, and the called station is ready to receive signals, the called station returns a CFR signal. However, if the level of the device noise is high, or the condition of the line L is bad and bit errors occur during the reception of the TCF signal, then the called station sends an FTT (Failure To Train) signal to the calling station. In response to the FTT signal, the calling station retransmits the modem training signal to train the modem 7 again.

In response to the reception of the CFR signal, the calling station retransmits a modem training signal and then transmits an image data signal to the called station. At the calling station, the original is read by the image reader 2, and encoded into an image data signal by the controller 6. The encoded image data signal is then stored in the memory 9. The stored image data signal is read out of the memory 9 and modulated by the modem 7, and transmitted through the line L. In the facsimile device 1 at the called station, the image data signal received through the line L is demodulated by the modem 7, decoded by the controller 6, and stored in the memory 9. The stored image data signal is then recorded on a recording medium by the image data recorder 3.

After the calling station has transmitted one page of image data, the calling station sends an RTC signal to indicate a return to the transmission control sequence. If there is a succeeding document to be transmitted, then the calling station transmits an MPS (Multipage Signal) signal. Further, an EOM (End of Message) signal is sent if there is a mode change such as a change of linear density. If the page that has been transmitted is the final page, then the calling station transmits an EOP (End of Procedure) signal to the called station.

When the called station has received all of the image data, the called station returns an MCP signal to the calling station to indicate that the image data has been properly received.

The above signaling procedure in the facsimile device 1 will be described below with reference to FIG. 3. The signaling procedure is carried out as a control sequence using binary signals. FIG. 3 shows a phase-B premessage procedure in which the function of the other facsimile device is identified, a selected condition is commanded, and a ready-to-receive condition is confirmed, before the image data or message is transmitted.

In the called station, for example, if the connection is established between the calling station, a DIS signal is transmitted to the calling station, and then a DCS signal is received (i.e., transmitted from the calling station) as described above.

If the signal transmitted from the calling station is a command signal in step #1, then the controller 6 determines whether the signal is a DTC (Digital Transmit Command) signal indicating the digital transmission, in step #2. If the signal is not the DTC signal, the controller 6 determines whether the signal is a DIS signal, in step #3. If the signal is not the DIS signal, the controller 6 determines whether the signal is a DCS signal in step #4. If the signal is the DCS signal, then control goes to a flow sequence (steps #5 through #7), indicated by the broken line, for adjusting phase and receiving a TCF signal to check the condition of the line L.

If the signal transmitted from the calling station is not a command signal in step #1, then control goes to step #11 for other communication procedures. Similarly, in step #2, if the signal is a DTC signal, control goes to step #12 to transmit a response signal for polling operation with respect to a mode setting command from the calling station. If the signal is a DIS signal in step #3, step #13 is executed and a capability identification signal is transmitted to the calling station in response to a signal representing the capability of the calling station. In step #4 if the signal is a DCS signal, then control goes to step #14 to return an error correcting signal for correcting an error of the digital command signal.

The TCF signal has a signal format in the form of a succession of Os. If '1' is recognized in the received TCF signal in step #5, then the controller 6 increments an error counter in step #6, otherwise control goes to step #7. Then the controller 6 determines whether 1 second has elapsed. If the one second time period has not elapsed then control goes to step #5 and the process is repeated.

If one second has elapsed at step #7, control goes to step #8 where controller 6 determines whether the count of the error counter is "0". If the count is "0" then the controller 6 returns a CFR signal in step #9. Otherwise, the controller 6 returns an FTT signal in step #10. The FTT signal is transmitted to the calling station to request that the modem train signal be retransmitted.

When the routine of training the modem 7 again is repeated, the transmission rate of the training data is reduced from 9600 bps to 7200 bps, 4800 bps and 2400 bps in succession. In this manner, the transmission rate can be switched to a rate that matches the level of device noise produced when the TCF signal is transmitted and received.

Figure 4:
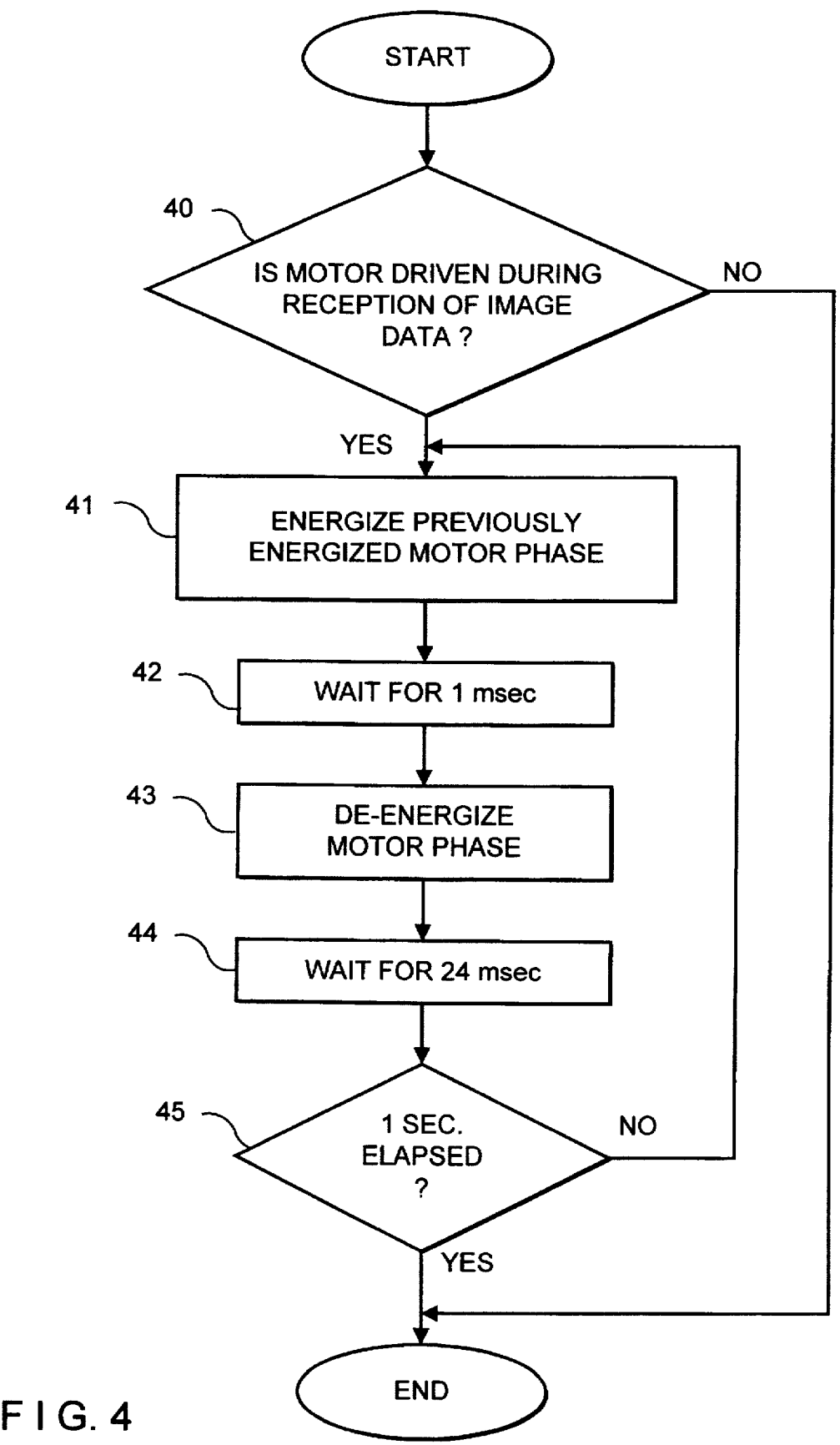
FIG. 4 is a flowchart of a process of controlling a motor in a facsimile device while a TCF signal is being transmitted.

FIG. 4 shows a motor controlling process of the called station during the phase adjustment and TCF signal reception. This motor control process is carried out during steps #5 through #7 shown in FIG. 3.

Initially in step #40, the controller 6 determines whether the motor of the driver 5 is to be driven during the reception of the image data. For instance, if image data stored in the image memory 9 is being printed when another set of image data is to be received, then the controller 6 determines that the motor of the driver 5 is being driven during reception of the image data. Control then proceeds to step #41.

However, if no image data is being printed when the image data is to be received, the motor of the driver 5 is not being driven and the sequence is ended.

At step #41, while the called station is receiving the TCF signal, the controller 6 energizes the motor of the driver 5 at the same phase as the previously energized phase, and then waits for 1 msec. in step #42. In step #43 the controller de-energizes the energized phase of the motor of the driver 5, then waits for 24 msec in step #44. At step #45, the controller 6 determines whether one second has elapsed. If one second has not elapsed steps #41 through #45 are repeated.

Therefore, as described above, if the motor of the driver 5 is to be driven during reception of image data, the controller 6 energizes the motor of the driver 5 during reception of the TCF signal. This generates electrical noise on the line L during TCF reception. Thus a baud rate is determined using a more accurate representation of the electrical characteristics of the line L which will be present during actual image data reception.

Further, as shown in the above process, if the controller 6 determines that the motor of the driver 5 does not need to be driven during image reception, then the motor of the driver 5 is not driven during TCF signal reception. Again, during TCF reception the line L will have electrical characteristics that more accurately represent the line L during actual image data reception. This would be the case if the image data is to be stored in the image memory 9 during image data reception.

Therefore, according to the present invention, the optimum baud rate can be established between the calling and called station depending on whether the motor of the driver 5 is to be driven. This minimizes communication errors and maximizes the transfer speed of the image data for the given conditions of the line L.

In the embodiment described above, the electrical noise is generated by driving the motor of the driver 5 during the TCF reception. However, another noise source such as a motor at the calling station can be driven. Further, in the above described embodiment, the example of printing image data while other image data is being received is illustrated. However, the present invention can be applied to the situation where the image data is being received at the called station while the motor of the driver 4 of the calling station is energized during transmission of the image data. In this case electrical noise generated by the motor of the driver 4 of the calling station can be introduced to the line L during the transmission of the TCF signal from the calling station. Thus, the baud rate can be optimized for the electrical characteristics of the line L that will be present during image data transmission.

In the above description only the motor of the driver 5 is driven. However, any actuated element such as a fixing device, a hard disk or floppy disk which may affect data transmission/reception can also be driven.

Further, in the above described embodiment, the transmission speed is established based upon the electrical characteristics of the line L, however, a method of coding the data and the resolution of the data can also be determined.

As also described above, the controller 6 determines whether the facsimile device is operated in a transmission-from-memory mode, a reception-to-memory mode, or a transmission/reception mode in which a motor is actuated. However, this determination can be made in accordance with the transmission mode such as polling transmission/ reception, retrieval transmission/reception, etc.

The application of the present invention is not limited to transmission/reception of image data, but can be applied to the communication of any data such as character data.

The present invention can be applied to communication between other device such as personal computers, as well as facsimile devices.

What is claimed is:

1. A data communicating device for at least transmitting or receiving data, comprising:

an actuating means that can be driven;

means for determining whether said actuating means is to be driven to perform a predetermined operation when said data is transmitted/received;

means for performing a predetermined communication procedure prior to transmission/reception of said data, a transmission condition being set when said predetermined communication procedure is performed by said performing means, wherein said transmission condition is set in accordance with a noise level of said actuating means that is generated when said actuating means is driven if said determining means determines that said actuating means is to be driven to perform said predetermined operation when said data is transmitted/received, and wherein said data is transmitted/received in accordance with said transmission condition.

2. The data communicating device according to claim 1 further comprising a memory for storing received data and/or data to be transmitted, wherein said actuating means comprises data recording means for recording said stored data, and wherein said determining means determines whether said data recording means is actuated when said data is transmitted/received.

3. The data communicating device according to claim 1 further comprising a memory for storing received data and/or data to be transmitted, wherein said actuating means comprises data obtaining means for obtaining data to be transmitted, and wherein said determining means determines whether said data obtaining means is actuated when said data is transmitted/received.

4. The data communicating device according to claim 1, wherein said data comprises image data.

5. The data communicating device according to claim 1, wherein said predetermined communication procedure includes a transmission of a TCF signal.

6. The data communicating device according to claim 1, wherein said transmission condition includes a transmission rate at which said data is communicated through a communication line connected to said data communicating device, and wherein said transmission rate is set depending on a level of noise present in said communication line when said predetermined communication procedure is being performed by said performing means.

7. The data communicating device according to claim 1, wherein said actuating means comprises a step motor, a phase of said step motor energized during said predetermined communicating procedure being unchanged, whereby said actuating means is actuated such that said actuating means does not perform said predetermined operation.

8. The data communicating device according to claim 1 further comprising means for driving said actuating means to be operated during said predetermined communication procedure if said determining means determines that said actuating means is to be driven when said data is transmitted/received.

9. A data communication system for communicating data from a calling station to a called station over a communication line, comprising:

image reading means for reading data to be communicated from said calling station to said called station;

first actuating means for actuating said image reading means to read said data at said calling station;

image recording means for recording data communicated from said calling station to said called station;

second actuating means for actuating said image recording means to record said data at said called station;

means for determining whether at least one of said first and second actuating means is to be driven; and means for performing a predetermined communication procedure prior to transmission/reception of said data, means for setting a transmission condition when said predetermined communication procedure is performed by said performing means, said transmission condition being set in accordance with a noise level of said at least one of said first and second actuating means that is generated when said at least one of said first and second actuating means is driven if said determining means determines that said at least one of said first and second actuating means is to be driven to perform said predetermined operation when said data is transmitted/received, and wherein said data is transmitted/received in accordance with said transmission condition set by said setting means.

10. The data communication system according to claim 9, wherein said predetermined communication procedure includes a transmission of a TCF signal.

11. The data communication system according to claim 9, wherein said transmission condition includes a rate at which said data is communicated through said communication line connected from said calling station to said called station, and wherein said setting means sets said transmission rate depending on a level of noise present in said communication line when said predetermined communication procedure is being performed by said performing means.

12. The data communication system according to claim 9 which further comprises:

means for controlling said at least one of said first and second actuating means to be operated during said predetermined communication procedure if said determining means determines that said at least one of said first and second actuating means is to be driven when said data is transmitted/received.

13. The data communication system according to claim 12 which further comprises:

first image storage means for storing data read by said image reading means; and second image storage means for storing data to be recorded by said image recording means, wherein if said data is communicated from said first image storage means to said second image storage means, said control means does not operate said at least first and second actuating means while said predetermined communication procedure is being performed.

14. A method of transmitting/receiving data through a communication line employed in a data communicating device, said device having an actuating means which generates electrical noise, said method comprising the steps of:

determining whether said actuating means is to be driven when said data is transmitted/received;

setting a transmission condition based on a level of said electrical noise if said determining step determines that said actuating means is to be driven when said data is transmitted/received; and transmitting/receiving said data in accordance with said set transmission condition set by setting step.

15. The method of claim 14, wherein said transmission condition comprises a transmission rate at which said data is transmitted/received.

16. The method of claim 14 which further comprises the step of actuating said actuating means when said transmission condition is set if said determining step determines that said actuating means is to be driven when said data is transmitted/received.

* * * * *

UNITED STATES PATENT AND TRADEMARK OFFICE
CERTIFICATE OF CORRECTION

PATENT NO. : 5,548,412
DATED : August 20, 1996
INVENTOR(S) : Fumihiro Minamizawa, Masayoshi Iguchi and Koji Takeyama It is certified that error appears in the above-indentified patent and that said Letters Patent is hereby corrected as shown below:

Title page, item [54], and col. 1, line 4, correct the title of the invention to read as follows:

--DATA COMMUNICATION DEVICE WITH TRANSMITTING CONDITION SET IN ACCORDANCE WITH NOISE LEVEL OF ACTUATING MEANS--

Signed and Sealed this

Tenth Day of December, 1996

Attest:

Attesting Officer

BRUCE LEHMAN

Commissioner of Patents and Trademarks